United States Patent [15] 3,657,547
Mansfield [45] Apr. 18, 1972

[54] MONOPULSE GAIN BALANCED AMPLIFICATION SYSTEM USING PILOT CARRIER TECHNIQUES

[72] Inventor: Gerald R. Mansfield, Raleigh, N.C.

[73] Assignee: The United States of America as represented by the Secretary of the Army

[22] Filed: Jan. 20, 1971

[21] Appl. No.: 107,964

[52] U.S. Cl. ......................250/203 R, 250/208, 250/220 M, 356/141

[51] Int. Cl. ......................................................G01j 1/20

[58] Field of Search..................250/203 R, 208, 209, 220 M; 356/141, 152

[56] References Cited

UNITED STATES PATENTS

| | | | |
|---|---|---|---|
| 3,143,650 | 8/1964 | Mizen | 250/203 R |
| 3,207,904 | 9/1965 | Heinz | 250/208 X |
| 3,470,377 | 9/1969 | Febre et al. | 250/209 X |
| 3,489,904 | 1/1970 | Hodara | 250/203 R |
| 3,591,292 | 7/1971 | Feuchter et al. | 250/203 R X |

*Primary Examiner*—Donald D. Forrer
*Assistant Examiner*—L. N. Anagnos
*Attorney*—Harry M. Saragovitz, Edward J. Kelly, Herbert Berl and Harold W. Hilton

[57] ABSTRACT

A monopulse type receiver utilizing pilot carrier techniques for providing precise angular error information. Four detector cells are arranged in a quadrant configuration for detecting pulses of laser energy, with the output from each cell being delivered to a respective video channel. Each video channel comprises amplification circuitry including an inner loop automatic gain control (AGC) which operates both on noise and the pilot carrier signal to ensure uniformity of response for each video channel. The video channel outputs are fed into respective sample and hold circuits which provide voltage amplitude outputs both to an outer AGC loop and to a pair of command signal normalizer circuits. The outer AGC loop raises or lowers the gain of each of the video channels as required by controlling the amount of pilot carrier signals interjected into the front of the system. The outputs of the normalizer circuits represent ratios of the energy difference in the four channels divided by the sum of the energies of the channels to provide the desired angular information to a gyro head or the like. Pulse presence determination circuits are also provided in order to reject pulses wider than would be expected.

10 Claims, 1 Drawing Figure

PATENTED APR 18 1972 3,657,547
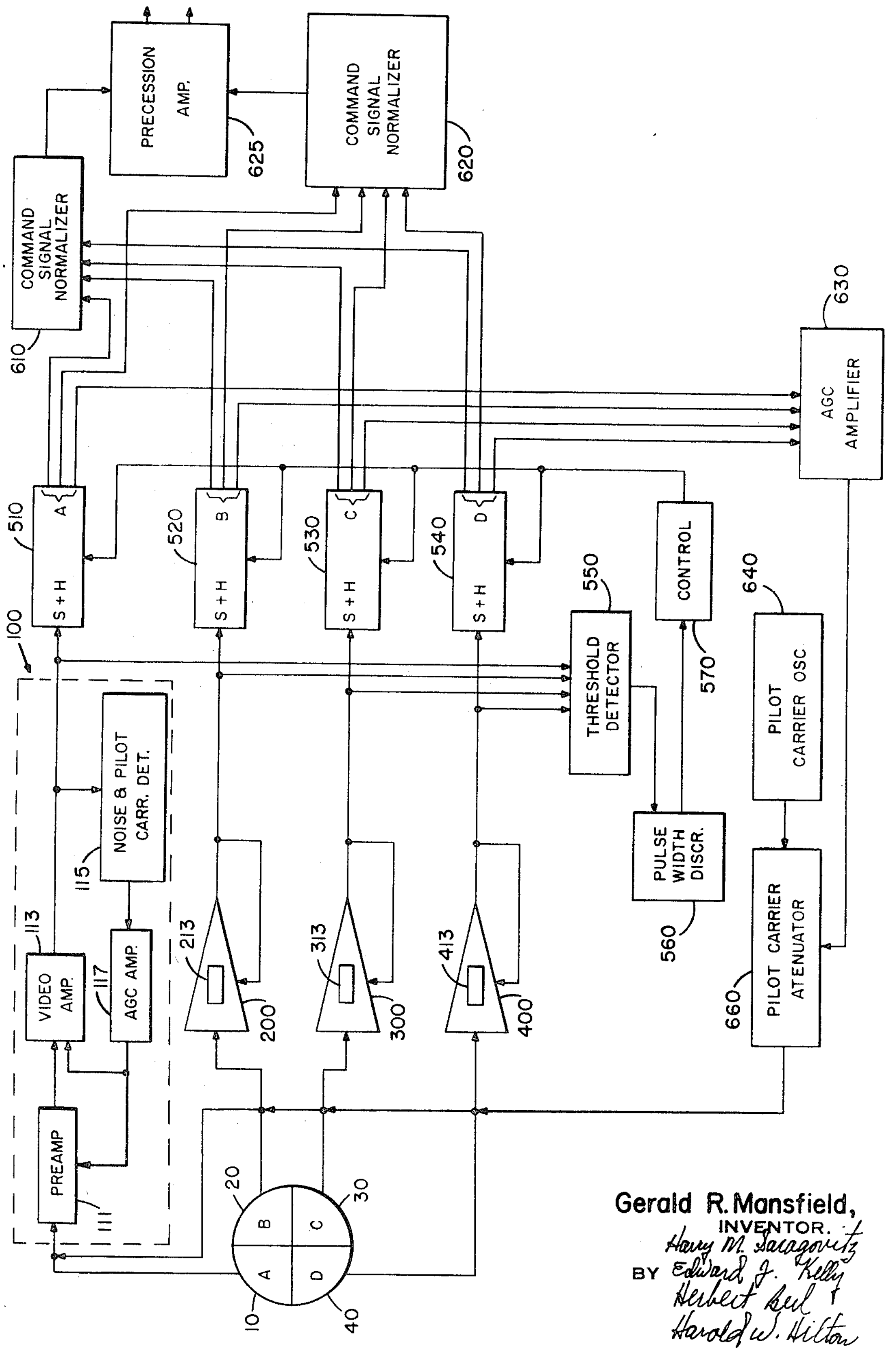
Gerald R. Mansfield,
INVENTOR.
BY Harry M. Saragovitz
Edward J. Kelly
Herbert Berl
Harold W. Hilton

MONOPULSE GAIN BALANCED AMPLIFICATION SYSTEM USING PILOT CARRIER TECHNIQUES

SUMMARY OF THE INVENTION

The apparatus of the present invention is a monopulse type receiver for detecting pulses of optical energy, and providing angular error information relative to the source of such pulses. The receiver collects and concentrates light on a multi-element detector whose optically sensitive cells may be arranged in a quadrant configuration. The desired angular information is determined by the ratio of differences of energies received in the various quadrants divided by the sum of the energies of all quadrants.

Four optical detector cells, arranged in a quadrant, connect an output signal to their respective video channels. Each detector output signal is amplified independently from other detector signals in a respective video channel. The video channels are matched, having the outputs thereof fed into respective sample and hold circuits and into a pulse discriminator circuit. The pulse discrimination circuit determines the presence of a true pulse and drives the sample and hold circuits to accept the pulse. Output signals from the sample and hold circuits are then combined to represent ratios of the energy difference in the four channels divided by the sum of the energies of the channels to provide the angular error information.

BRIEF DESCRIPTION OF THE DRAWING

The single FIGURE is a block diagram of a preferred embodiment of the invention.

DESCRIPTION OF THE PREFERRED EMBODIMENT

A preferred embodiment of the present invention is disclosed in the single drawing. The system includes four independent receiving video channels 100, 200, 300, and 400. Video channel 100 includes an input stage preamplifier 111 and a video amplifier 113. The output of video amplifier 113 is connected to a pilot carrier and noise detector 115. Detector 115 has an output connected to an automatic gain control (AGC) amplifier 117. AGC amplifier 117 has feedback outputs respectively connected to preamplifier 111 and video amplifier 113. Thus, video channel 100 includes video amplifier circuitry, a detector circuit and automatic gain control providing a channel inner loop feedback.

An optical energy detector 10 has an output thereof connected to an input of preamplifier 111 of channel 100. An output signal from video amplifier 113 is further connected to a sample and hold circuit 510 and to a threshold detector 550. Detector 550 has an output connected to a pulse width discriminator 560. A control circuit 570, or gating circuit, has an input connected to the output of discriminator 560 and an output connected to provide a gating signal to a gated peak-detector, sample and hold circuit (S+H) 510. A pair of outputs from S+H circuit 510 are connected to command signal normalizers 610 and 620. Normalizers 610 and 620 provide an output signal for tracking the direction of received optical energy. The output from command signal normalizers 610 and 620 is connected as an input to a precession amplifier 625. Another output from S+H circuit 510 is connected as an input to an automatic gain control (AGC) amplifier 630. A pilot carrier oscillator 640 has an output connected to an attenuator 660, providing a pilot frequency for video channel 100. AGC amplifier 630 has an output connected to attenuator 660 providing a system (outer loop) feedback control. Three additional video channels 200, 300, and 400 receive an input signal respectively from light sensitive detectors 20, 30, and 40, and have output signals connected to respective S+H circuits 520, 530, and 540 for coupling to normalizers 610 and 620. All video channel circuitry is as described with respect to channel 100. An output of pilot carrier attenuator 660 is connected to each video channel input for providing the pilot frequency thereto.

The four light sensitive detectors are arranged in a quadrant configuration, with the output from each cell being delivered to a respective video channel. Detector cell output currents are injected into their respective preamplifiers along with pilot carrier currents, the carrier currents being the same in all video channels. The input video signals are amplified in the respective video amplifiers and subsequently the noise and pilot carrier detectors detect the noise and pilot carrier that is present in each channel. This output is supplied to the respective inner loop AGC amplifier arranged to operate a number of gain control points in the corresponding pre-amplifier and video amplifier.

The noise and pilot carrier detector of each inner feedback loop is designed so that the characteristics are the same in all four channels. Each inner loop AGC amplifier is provided with a reference voltage level so that the sum of the noise and pilot carrier at the output of each video amplifier is a well defined level when the inner loop is closed, thus assuring uniformity of response in each channel irregardless of which detector cell the light falls on.

The AGC amplifier of each video channel utilizes capacitor feedback so that it acts as an integrator. This results in the sum of pilot carrier and internal noise level at the output of each video amplifier being equal to that of other channels. The pilot carrier input current is the same in all channels, thereby insuring that the gain of each channel at the pilot carrier frequency is equal when the pilot carrier is greater than noise. Unbalance can occur at signal levels near the threshold of detectability. Balance is not required at signal threshold and the system adjusts itself for maximum possible sensitivity as explained later. With the gain of all video channels being equal, the signals supplied to both command signal normalizers and the pilot carrier AGC amplifier are proportional to the corresponding optical detector outputs with the same proportionality constant applying to the four independent channels.

Outputs of respective video channels are coupled to respective S+H circuits where they are delayed, awaiting acceptance or rejection. If rejected, the signal is dumped after the delay, and if accepted, the respective channel outputs A, B, C, and D are connected to command signal normalizers 610 and 620 for sum and difference computation. An S+H output is also connected as part of the outer feedback loop through AGC amplifier 630, allowing the gain of the video channels to be raised or lowered as required by controlling the amount of pilot carrier signal injected into the preamplifiers by pilot carrier attenuator 660. Connected as an integrator, AGC amplifier 630 closes an outer loop gain control arrangement so that the summed channel outputs A, B, C, and D are held to a relatively fixed value. Because of the possible fluctuations of received signal energy, the outer loop feedback cannot anticipate the power of the next pulse to be received. Therefore, the sum of the sample and hold outputs vary around an ideal steady state condition, and the controlled attenuator 660 varies relatively slowly thereby varying the pilot carrier level to each video channel. The pilot carrier levels supplied to each video channel are equal to each other at all times and at all levels.

Pilot carrier oscillator 640 feeds attenuator 660 with a frequency that is very high as compared to the attenuator control signals emerging from AGC amplifier 630. The inner feedback loops of each channel maintain video gain balance while changing channel gain in response to pilot carrier attenuator output change which in turn is in response to changes in the level of the pulses of optical energy received. The inner loops respond rapidly compared to the optical pulse rate so that gain balance between channels is preserved even during transient conditions in the outer loop. The pilot carrier frequency can be located in the flat portion of the video amplifier band pass. Current injection to the preamplifiers is accomplished with chokes which do not increase the level of noise in the preamplifiers. Selective amplification is provided to the pilot carrier injection needed when the input signals are very strong. Thus, the inner loops control the video amplifier gain such that the sum of noise and pilot carrier level is the same at all video amplifier outputs.

A detected signal coupled from each video channel to detector 550 may be determined to be sufficiently above the noise level as to assure with a high degree of reliability that the correct pulse is being detected, with discriminator 560 being arranged to reject pulses that are wider than are expected. Under overload conditions such as might be expected by suddenly presenting strong signals to the receiver, the overloaded video amplifier produces successive overshoots which can exceed the amplitude thresholds of detector 550. Pulse width discriminator 560, responsive to the output of detector 550, accepts the pulse of overload signals but rejects the longer wider tail of an overload pulse, thereby making the receiver operate only on a true pulse.

The output of pulse width discriminator 560 drives control circuit 570 which in turn drives the S+H circuits to accept and detect the peak of video pulses. The signal received by each S+H circuit is coupled through a delay line therein which delays the video pulses for a short time during which the video pulses connected to detector 550 are operating control circuit 570. When a video pulse emerges from the delay line, it is either accepted or rejected by the pulse presence determination circuitry. For an accepted pulse, the S+H circuits operate as gated peak-detectors. Each gated peak-detector, S+H circuit, output is a direct potential signal approximately equal in amplitude to the accepted pulse corresponding to the pulse current from the respective optical detector quadrant. Since the detectors individually and collectively give close correspondence between the incident power and its current output, the sample and hold direct potential outputs are proportional to the peak power on the corresponding optical energy detector. Thus, the direct potential output of each sample and hold circuit corresponds to the energy received by its detector input, with the degree of proportionality being the same for all four channels. The outputs A, B, C, and D of sample and hold circuits 510, 520, 530, and 540 are coupled to normalizers 610 and 620 wherein the operation of differencing and dividing is provided. Normalizer 610, for example, provides the up-down (pitch) angular error corresponding to $$\frac{(A+B)-(C+D)}{A+B+C+D}.$$

Normalizer 620 provides the yaw angular error that corresponds to $$\frac{(B+C)-(A+D)}{A+B+C+D}.$$

The difference between optical energies received on the detector quadrants divided by the sum of the total energy received gives a measure of angular error of the optical energy source from the optical heading null axis. A null point is achieved when the received energy is equal on all optical energy detectors, which indicates that no error correction is needed. Normalizing the S+H output pulse level prevents residual fluctuations from affecting the computed angular error.

When no optical energy pulses of a detectable level are present, gain amplifier 630 sets the gain to the maximum possible, which involves virtually cutting off the pilot carrier current injected into the preamplifiers. When no pilot carrier is injected into the preamplifiers, the individual feedback control loops of each video channel causes the video amplifier gain to increase to a value such that noise operates the pilot carrier detector. Thus, the noise level within each channel will reach a well defined level. The amplitude detector within the threshold detector 550 are adjusted so that the well defined noise level is insufficient to operate threshold detector 550 thereby ensuring that noise in the absence of a signal will not be accepted and detected at the gated peak-detectors. When the video channels are at a maximum gain setting, pilot carrier input is at a minimum and the noise levels at the preamplifier inputs are not necessarily equal, thus, the video gains of the channels are not necessarily balanced. Some noise current flow is caused by ambient light on the detector cells, which may vary from cell to cell, for example.

The system readjusts itself for the maximum possible sensitivity even as noise inputs at each cell varies. The threshold detector 550 tests for pulses in individual channels as well as pulses that are shared between adjacent channels. For example, if the spot of light detected by the optical detector cells is predominantly located on cell 20, the output video pulse in channel 200 will be greater than the output pulses from the other channels, because the overall gain of each preamplifier-video amplifier combination is the same in all four channels. The sample and hold outputs correspond in amplitude to the preamplifier input pulses.

Thus all four channels are matched and the inner feedback loops insure that all channels have the same scaling factor. The outer feedback path from sample and hold circuits through AGC amplifier 630 and attenuator 660 determines what the system scaling factor is, in accordance with the input level measured by the light sensitive detectors. With all four video channels being matched, the output signal of each S+H circuit is a function of the input signal received from the associated light detector. Also, in optical detectors, sensitivity is improved by detecting and amplifying the sector detector outputs separately rather than forming sum and differences at the input to the electronic system as is common in radio or radar systems.

Although a particular embodiment and form of this invention has been illustrated, it is obvious to those skilled in the art that modifications may be made without departing from the scope and spirit of the foregoing disclosure. For example, angular error information can be obtained from three sector detectors with three inner loop video channels and three sample and hold circuits. Three command signal normalizers may be used if desired with this approach. Therefore, it is understood that the invention is limited only by the claims appended hereto.

I claim:

1. A gain balanced amplification system comprising: a pilot carrier source having an output, a plurality of video channels having an input and an output, attenuator means coupling the output of said pilot carrier source to respective inputs of said plurality of video channels, detector means connected to the output of each of said video channels, a plurality of gated peak-detector means having inputs connected to outputs of respective video channels for accepting or rejecting an output signal therefrom, gating control means having an input connected to said detector means and responsive thereto for providing an output gating signal to each said plurality of gated peak-detector means, and an automatic gain control amplifier having inputs responsive to each of the said plurality of gated peak-detectors and an output connected to said attenuator means, said amplification and automatic gain control system providing a plurality of amplification channels between the inputs to the plurality of video channels and the outputs of the corresponding gated peak-detectors with amplification of said channels remaining in a fixed ratio with each other over a large range of signal input levels.

2. A gain balanced amplification system as set forth in claim 1 and further comprising a plurality of optical detecting means, said detecting means having respective outputs connected to corresponding inputs of said plurality of video channels.

3. A gain balanced amplification system as set forth in claim 2 and further comprising a plurality of differencing means having inputs responsive to the outputs of said gated peak-detector means for computing angular error information therein, and having respective outputs for coupling out said angular error information.

4. A gain balanced amplification system as set forth in claim 3 wherein said detector means comprises a threshold detector having an output and inputs connected to the outputs of each of said channels, and a pulse width discriminator having an input connected to said threshold detector and an output connected to said gating control means.

5. A gain balanced amplification system as set forth in claim 3 wherein said plurality of video channels comprises at least four channels, said plurality of optical detecting means comprises at least four optical detectors arranged in a quadrant configuration for receiving optical energy and coupling an output signal that is proportional to the optical energy received by each detector sector to respective video channels, and said gated peak-detector means comprises at least four circuits for providing an output signal proportional to said detected optical energy.

6. A gain balanced amplification system as set forth in claim 5 wherein each of said video channels comprise a preamplifier having an input connected to a respective sector optical detector and to said attenuator means, a video amplifier having an input connected to an output of said preamplifier and an output connected to said respective gated peak-detector circuit and to said threshold detector, a noise and pilot carrier detector having an input connected to the output of said video amplifier, and an automatic gain control amplifier having an input connected to an output of said noise detector and an output connected to said video amplifier and said preamplifier.

7. A gain balanced amplification system as set forth in claim 6 wherein said first and second differencing means are signal normalizing circuits for providing sum and difference combination of said gated peak-detector circuit outputs, said pilot carrier means is an oscillator, and further comprising a precession amplifier connected to the output of said normalizing circuit for providing an angular error correcting signal when the optical energy incident to said optical detectors is imbalanced.

8. A gain balanced amplification system as set forth in claim 3 wherein each of said video channels comprise a preamplifier having an input connected to a respective optical detector and to said attenuator means, a video amplifier having an input connected to an output of said preamplifier and an output connected to said respective gated peak-detector circuit and to said detector means, a noise and pilot carrier detector having an input connected to the output of said video amplifier, and an automatic gain control amplifier having an input connected to an output of said noise detector and an output connected to said video amplifier and said preamplifier.

9. A gain balanced amplification system as set forth in claim 4 wherein each of said video channels comprise a preamplifier having an input connected to a respective optical detector and to said attenuator means, a video amplifier having an input connected to an output of said preamplifier and an output connected to said respective gated peak-detector circuit and to said threshold detector, a noise and pilot carrier detector having an input connected to the output of said video amplifier, and an automatic gain control amplifier having an input connected to an output of said noise detector and an output connected to said video amplifier and said preamplifier.

10. A gain balanced amplification system as set forth in claim 4 wherein said plurality of video channels comprises at least four channels, said plurality of optical detecting means comprises at least four optical detectors arranged in a quadrant configuration for receiving optical energy and coupling an output signal that is proportional to the optical energy received by each detector sector to respective video channels, and said gated peak-detector means comprises at least four circuits for providing an output signal proportional to said detected optical energy.

* * * * *